United States Patent
Nagata et al.

(10) Patent No.: US 9,706,031 B2
(45) Date of Patent: Jul. 11, 2017

(54) PORTABLE TERMINAL AND LOCK STATE CONTROL METHOD

(71) Applicant: KYOCERA Corporation, Fushimi-ku, Kyoto-shi, Kyoto (JP)

(72) Inventors: Keisuke Nagata, Kobe (JP); Yoshinori Kida, Sakai (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 14/375,128

(22) PCT Filed: Jan. 10, 2013

(86) PCT No.: PCT/JP2013/050252
§ 371 (c)(1),
(2) Date: Jul. 28, 2014

(87) PCT Pub. No.: WO2013/111618
PCT Pub. Date: Aug. 1, 2013

(65) Prior Publication Data
US 2015/0004938 A1 Jan. 1, 2015

(30) Foreign Application Priority Data
Jan. 27, 2012 (JP) .................. 2012-015218

(51) Int. Cl.
*H04B 1/38* (2015.01)
*H04M 1/00* (2006.01)
(Continued)

(52) U.S. Cl.
CPC ............ *H04M 1/67* (2013.01); *G06F 3/0416* (2013.01); *H04M 1/72577* (2013.01); *H04M 2250/22* (2013.01)

(58) Field of Classification Search
None
See application file for complete search history.

(56) References Cited

U.S. PATENT DOCUMENTS 5,590,340 A * 12/1996 Morita ............... G06F 1/30
713/323
2009/0327976 A1* 12/2009 Williamson et al. ......... 715/863
(Continued)

FOREIGN PATENT DOCUMENTS

JP 2003-333175 A 11/2003
JP 2004-128780 A 4/2004
(Continued)

OTHER PUBLICATIONS

"Tonchikun no sougyou nikki" [online], Dec. 9, 2011, downloaded Feb. 25, 2012 http://ameblo.jp/tonchikun/entry-11102413758.html.
(Continued)

*Primary Examiner* — Moustapha Diaby
(74) *Attorney, Agent, or Firm* — Procopio Cory Hargreaves and Savitch LLP

(57) ABSTRACT

A mobile phone 10 comprises a display 14, a touch panel 16 provided on the display 14, etc., and a screen lock state that a performance of a predetermined function (mail function or the like) based on a touch operation is invalidated is set. The screen lock state is set if an end key 22b is operated and the display 14 is turned off, for example. Then, the user can cancel the screen lock state by performing a canceling operation. In a case where the display 14 is turned off through an operation of a turn-off key (70), the display 14 is temporarily turned off. In such a case, it is possible for the user to restore the displaying of the display 14 to an original state thereof by operating the end key 22b or the like without canceling operation.

7 Claims, 13 Drawing Sheets

(51) Int. Cl.
*H04M 1/66* (2006.01)
*H04M 1/67* (2006.01)
*H04M 1/725* (2006.01)
*G06F 3/041* (2006.01)

(56) References Cited

U.S. PATENT DOCUMENTS

| | | | | |
|---|---|---|---|---|
| 2011/0098019 A1* | 4/2011 | Fujii | ............... | H04M 1/576 |
| | | | | 455/411 |
| 2011/0161864 A1* | 6/2011 | Nagasaka | ............ | G01C 21/367 |
| | | | | 715/784 |
| 2011/0179366 A1* | 7/2011 | Chae | ............... | G06F 21/84 |
| | | | | 715/764 |
| 2012/0094722 A1* | 4/2012 | Kim | ............... | 455/566 |
| 2012/0162690 A1* | 6/2012 | Ishiguro et al. | ............ | 358/1.14 |
| 2012/0208501 A1* | 8/2012 | Tsuda | ............... | H04M 1/67 |
| | | | | 455/411 |
| 2012/0220264 A1* | 8/2012 | Kawabata | ............... | 455/411 |
| 2013/0174094 A1* | 7/2013 | Heo | ............... | G06F 3/04883 |
| | | | | 715/835 |
| 2013/0187753 A1* | 7/2013 | Chiriyankandath | .. | G06F 3/0488 |
| | | | | 340/5.51 |
| 2013/0232568 A1* | 9/2013 | Nunami | ............... | G06F 21/32 |
| | | | | 726/17 |

FOREIGN PATENT DOCUMENTS

| | | |
|---|---|---|
| JP | 2009-272996 A | 11/2009 |
| JP | 2011-254366 A | 12/2011 |
| JP | 2012-150625 A | 8/2012 |
| WO | 2012/124454 A1 | 9/2012 |

OTHER PUBLICATIONS

International Search Report dated Mar. 12, 2013 issued in counterpart International Application No. PCT/JP2013/050252.

* cited by examiner

FIG. 5
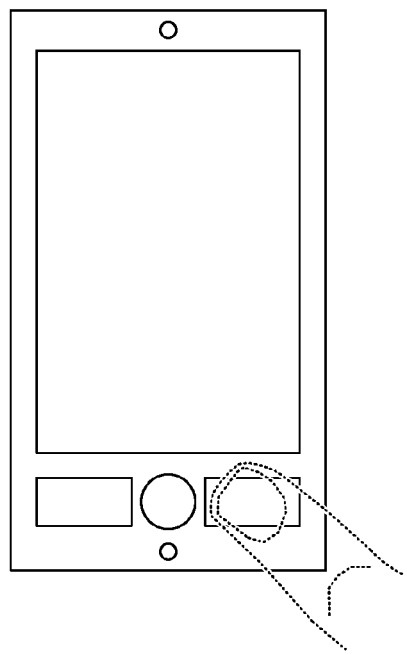 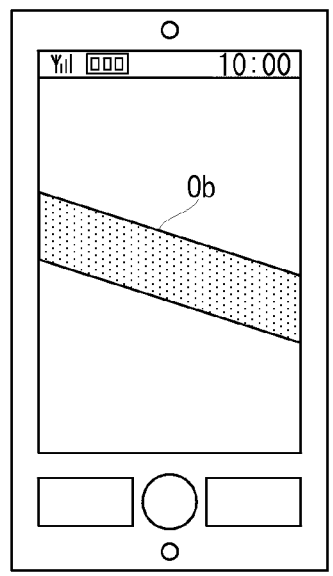
FIG. 6
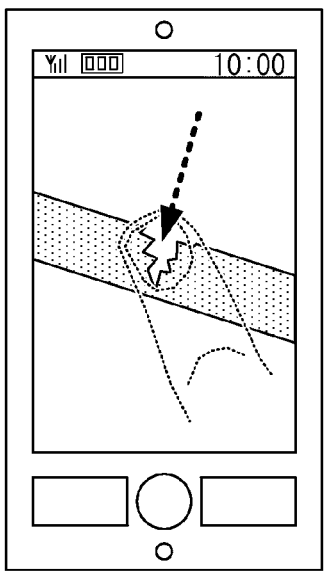 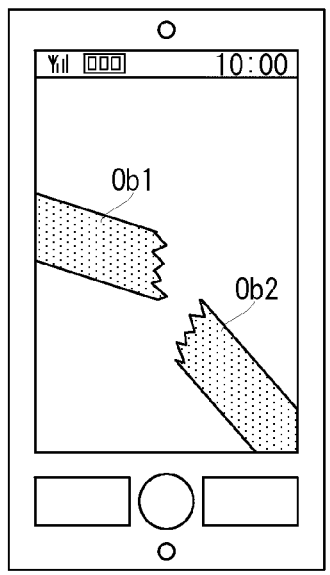 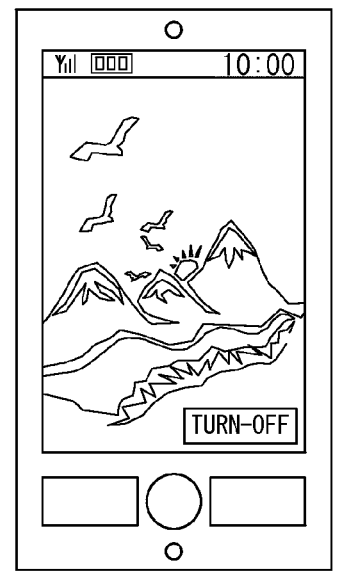

FIG. 7
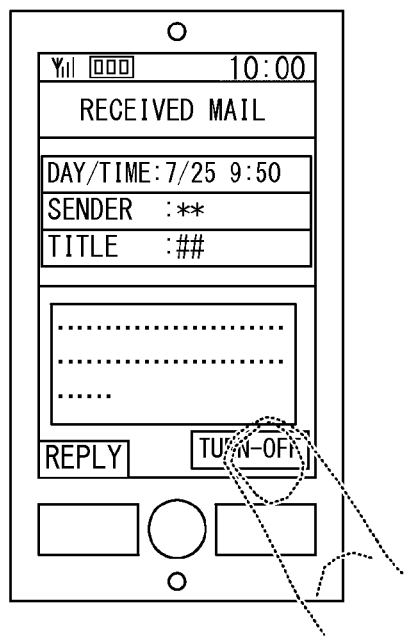
(A)
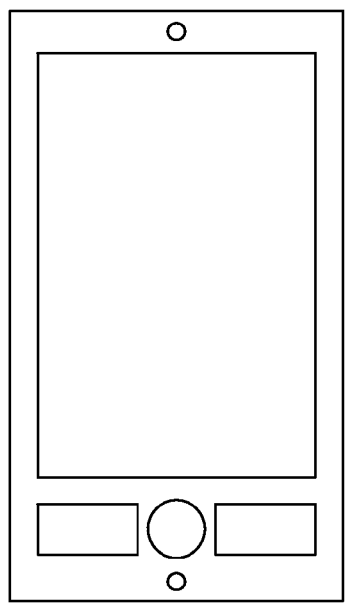
(B)
FIG. 8
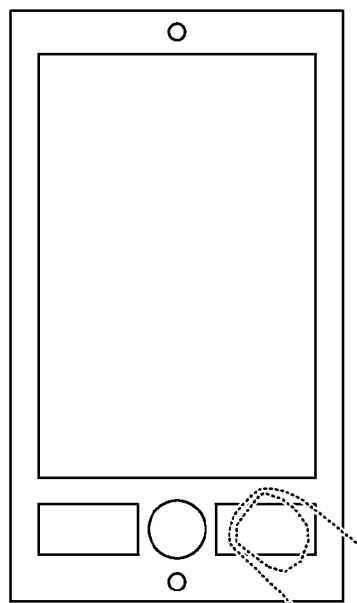
(A)
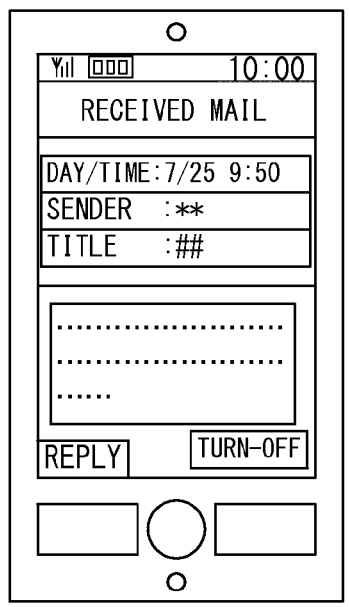
(B)

PORTABLE TERMINAL AND LOCK STATE CONTROL METHOD

FIELD OF ART

The present invention relates to a mobile terminal and a lock state control method, and more specifically, a mobile terminal and a lock state control method, capable of setting a lock state that a part of operation is invalidated.

BACKGROUND ART

An example of a mobile terminal capable of setting a lock state that a part of operation is invalidated is disclosed in Patent Literature 1. In a mobile phone of Patent Literature 1, a key lock is set when operating keys are operated by a predetermined number of times in a predetermined operating order or when a predetermined time period elapses with no operation. Then, the user can cancel the key lock by inputting a personal identification number or the like.

Patent Literature 1: Japanese Patent Application Laying-Open No. 2004-128780 [G06F 3/048, H04N 5/225, G06F 3/041, H04M 1/247]

SUMMARY OF THE INVENTION

Problems to be Solved by the Invention

However, in the mobile phone of Patent Literature 1, in a case where the predetermined time period for determining a no operation state is set short, the no operation state is determined only if the user temporarily stops the operation, the key lock is set. In such a case, in order to restart the operation, the user who temporarily stopped the operation has to cancel the key lock by inputting a personal identification number or the like. Therefore, if such canceling of the key lock frequently occurs, the user feels that the canceling operation is troublesome.

Therefore, a primary object of the present invention is to provide a novel mobile terminal and a lock state control method.

Another object of the present invention is to provide a mobile terminal and a lock state control method, capable of easily determining by the user whether a lock state is to be set.

Means for Solving the Problems

A first aspect according to the present invention is a mobile terminal, comprising: a display; a touch panel provided on the display; a detecting module operable to detect a touch operation to the touch panel; an operating module operable to receive an operation by a user; a setting module operable to set a screen lock state that a part of the touch operation is invalidated when a first condition is satisfied; a turning off module operable to turn off the display when a second condition is satisfied in accordance with the operation by the user; an invalidating module operable to invalidate the setting module when the display is turned off by the turning off module; and a displaying processing module operable to display on the display a previous screen before the display is turned off by the turning off module when the operating module receives the operation in a state that the setting module is invalidated.

A second aspect according to the present invention is a lock state control method of a mobile terminal which comprises a display; a touch panel provided on the display; a detecting module operable to detect a touch operation to the touch panel; an operating module operable to receive an operation by a user; and a setting module operable to set a screen lock state that a part of the operation is invalidated when a first condition is satisfied, comprising steps of: turning off the display when a second condition is satisfied in accordance with the operation by the user; invalidating the setting module when the display is turned off; and displaying on the display a previous screen before the display is turned off by the turning off module when the operating module receives the operation in a state that the setting module is invalidated.

Advantages of the Invention

According to the present invention, the user can easily determine whether the screen lock state is to be set.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 4(A) shows a state that an operation is performed to an end key, and FIG. 4(B) shows a state that the display shown in FIG. 1 is turned off.

FIG. 5 shows an example of a procedure at a time that a screen lock screen is displayed, FIG. 5(A) shows a state that an operation is performed to an end key, and FIG. 5(B) is an example of a screen lock screen that is displayed on the display shown in FIG. 1.

FIG. 6 shows an example of a canceling operation to the screen lock screen shown in FIG. 5(B), FIG. 6(A) shows an example of a touch operation that is performed to the screen lock screen shown in FIG. 5(B), FIG. 6(B) shows another example of the screen lock screen that is displayed on the display shown in FIG. 1, and FIG. 6(C) shows a stand-by screen that is displayed on the display shown in FIG. 1.

FIG. 7 shows an example of a procedure at a time that a display shown in FIG. 1 is to be temporarily turned off, FIG. 7(A) shows a state that an operation is performed to a turn-off key, and FIG. 7(B) shows a state that the display shown in FIG. 1 is turned off.

FIG. 8 shows an example of a procedure that the display shown in FIG. 1 is returned to an original state thereof from a temporarily turned off state, FIG. 8(A) shows a state that an operation is performed to the end key, and FIG. 8(B) shows an example of a previous screen that is displayed on the display shown in FIG. 1.

FIG. 13(A) shows another state that an operation is performed to the turn-off key, FIG. 13(B) shows a state that the display shown in FIG. 1 is turned off, and FIG. 13(C) shows an example of a security lock screen is displayed on the display shown in FIG. 1.

FORMS FOR EMBODYING THE INVENTION

<First Embodiment>

Figure 1:
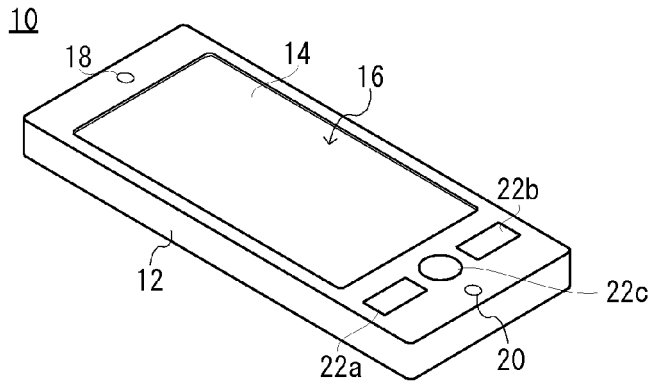
FIG. 1 is an appearance view showing a mobile phone of an embodiment according to the present invention.

With referring to FIG. 1, a mobile phone 10 of an embodiment according to the present invention is a smartphone as an example, and includes a longitudinal flat rectangular housing 12. However, it is pointed out in advance that the present invention can be applied to an arbitrary mobile terminal such as a tablet terminal, a PDA, etc.

A display 14 of a liquid crystal, organic EL or the like is provided on a main surface (front surface) of the housing 12. A touch panel 16 is provided on the display 14. Therefore, in the mobile phone 10 of this embodiment, the most part of an input operation excepting an input by an operation of a hardware key described later is performed through the touch panel 16.

A speaker 18 is housed in the housing 12 at one end of a longitudinal direction on a side of the front surface, and a microphone 20 is housed at the other end in the longitudinal direction on the side of the front surface.

As hardware keys constituting an input operating module together with the touch panel 16, a call key 22a, an end key 22b and a menu key 22c (second key) are provided, in this embodiment.

For example, the user can input a telephone number by performing a touch operation by the touch panel 16 to a dial key (not shown) displayed on the display 14, and start a telephone conversation by operating the call key 22a. If the end key 22b is operated, the telephone conversation can be ended. In addition, by long-depressing the end key 22b, it is possible to turn on/off a power of the mobile phone 10. Therefore, the end key 22b may be called as a power key.

If the menu key 22c is operated, a menu screen is displayed on the display 14, and in such a state, by performing a touch operation by the touch panel 16 to a software key, a menu icon or the like (both not shown) being displayed on the display 14, it is possible to select a menu and to determine such a selection. Then, the user can perform, with using the menu screen, a telephone conversation function, a mail function, and an address book function, etc.

Figure 2:
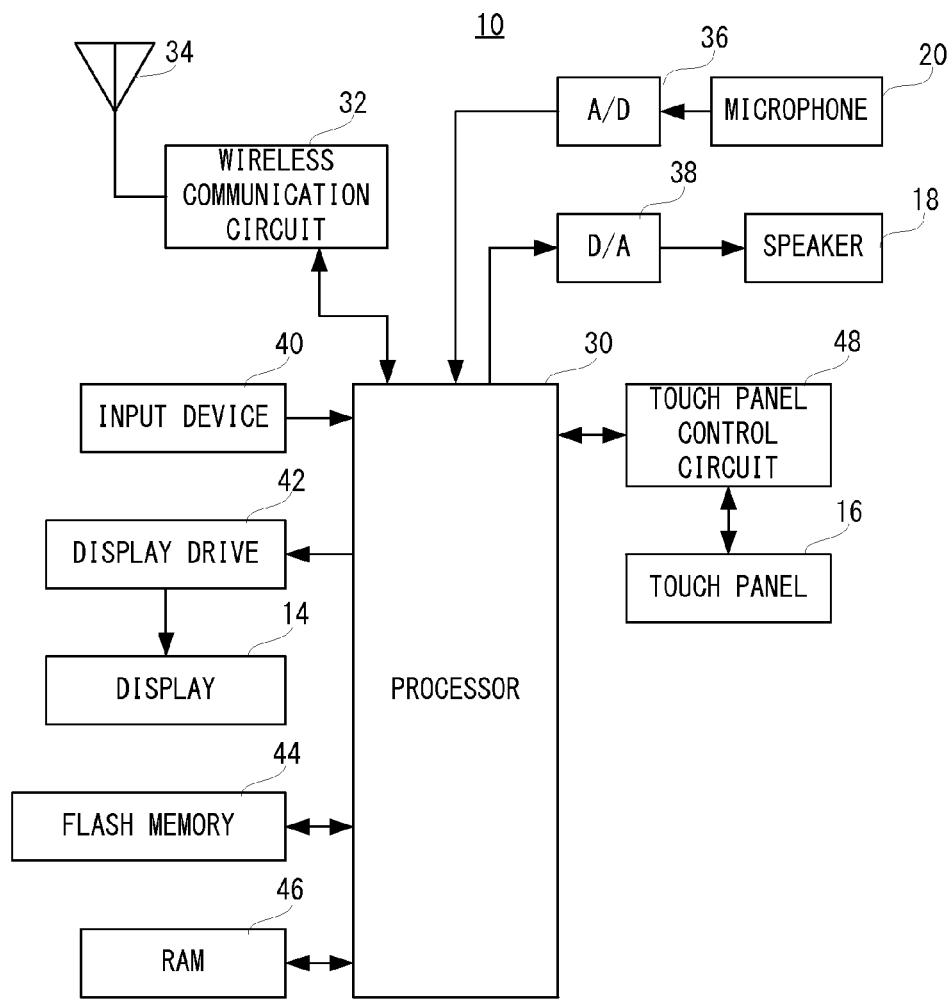
FIG. 2 is a view showing electrical structure of the mobile phone shown in FIG. 1.

With referring to FIG. 2, the mobile phone 10 of the embodiment shown in FIG. 1 includes a processor 30 that is called as a computer or a CPU. The processor 30 is connected with a wireless communication circuit 32, an A/D converter 36, a D/A converter 38, an input device 40, a display driver 42, a flash memory 44, a RAM 46, a touch panel control circuit 48, etc.

The processor 30 is in charge of a whole control of the mobile phone 10. A whole or a part of a program set in advance in the flash memory 44 is, in use, developed or loaded into the RAM 46 that functions as a storing module, and the processor 30 operates in accordance with the program developed in the RAM 46. In addition, the RAM 46 is further used as a working area or buffer area for the processor 30.

The input device 40 includes the touch panel 16 and the hardware keys 22 shown in FIG. 1, and constitutes an operating module or an inputting module. Information (key data) of the hardware key that the user operated is input to the processor 30.

The wireless communication circuit 32 is a circuit for transmitting and receiving a radio wave for a telephone conversation, a mail, etc. via an antenna 34. In this embodiment, the wireless communication circuit 32 is a circuit for performing a wireless communication with a CDMA system. For example, if the user designates an outgoing call (telephone call) using the input device 40, the wireless communication circuit 32 performs the telephone call processing under instructions from the processor 30 and outputs a telephone call signal via the antenna 34. The telephone call signal is transmitted to a telephone at the other end of the line through a base station and a communication network. Then, when the incoming call processing is performed in the telephone at the other end of the line, a communication-capable state is established and the processor 30 performs the telephonic communication processing.

Specifically describing a normal telephone conversation process, a modulated voice signal sent from a telephone at the other end of the line is received by the antenna 34. The modulated voice signal received is subjected to the demodulation processing and the decode processing by the wireless communication circuit 32. A received voice signal obtained through such processing is converted into a voice signal by the D/A converter 38 to be output from the speaker 18. On the other hand, a sending voice signal taken-in through the microphone 20 is converted into voice data by the A/D converter 36 to be applied to the processor 30. The voice data is subjected to the encode processing and the modulation processing by the wireless communication circuit 32 under instructions by the processor 30 to be output via the antenna 34. Therefore, the modulated voice signal is transmitted to the telephone at the other end of the line via the base station and the communication network.

When the telephone call signal from a telephone at the other end of the line is received by the antenna 34, the wireless communication circuit 32 notifies the processor 30 of the incoming call. In response thereto, the processor 30 displays on the display 14 sender information (telephone number and so on) described in the incoming call notification by controlling the display driver 42. In addition, according to the above-described processing, the processor 30 outputs from the speaker 18 a ringtone (may be also called as a ringtone melody, a ringtone voice).

Then, if the user performs an answering operation by using the call key 22a (FIG. 1) included in the input device 40, the wireless communication circuit 32 performs the processing for establishing a communication-capable state under instructions by the processor 30. Furthermore, when the communication-capable state is established, the processor 30 performs the above-described telephone conversation processing.

If the telephone conversation ending operation is performed by the end key 22b (FIG. 1) included in the input device 40 after a state is changed to the communication-capable state, the processor 30 transmits a telephone conversation ending signal to the telephone at the other end of the line by controlling the wireless communication circuit 32. Then, after the transmission of the telephone conversation ending signal, the processor 30 terminates the telephone conversation processing. Furthermore, in a case where the telephone conversation ending signal from the telephone at the other end of the line is received, the processor 30 also terminates the telephone conversation processing. In addition, in a case that the telephone conversation ending signal is received from the mobile communication network not from the telephone at the other end of the line, the processor 30 also terminates the telephone conversation processing.

The microphone 20 shown in FIG. 1 is connected to the A/D converter 36, and as described above, a voice signal from the microphone 20 is input to the processor 30 as digital voice data through the A/D converter 36. The speaker 18 is connected to the D/A converter 38. The D/A converter 38 converts digital voice data into a voice signal so as to apply to the speaker 18 via an amplifier. Therefore, a voice of the voice data is output from the speaker 18.

In addition, the processor 30 adjusts, in response to an operation for adjusting a volume by the user, a voice volume of the voice output from the speaker 18 by controlling an amplification factor of the amplifier connected to the D/A converter 38.

The display driver 42 is connected to the display 14 and the processor 30, and stores image data that is output from the processor 30 to a VRAM. Then, the display driver 42 displays on the display 14 the images in accordance with image data in the VRAM. That is, the display driver 42 controls displaying by the display 14 that is connected to the display driver 40 under instructions by the processor 30. In addition, the display 14 is provided with a backlight which includes a light source of an LED or the like, for example, and the display driver 42 controls, according to the instructions from the processor 30, brightness, turning on/off of the backlight.

The touch panel 16 shown in FIG. 1 is connected to a touch panel control circuit 48. The touch panel control circuit 48 applies to the touch panel 16 a necessary voltage or the like and inputs to the processor 30 a touch start signal indicating a start of a touch by the user to the touch panel 16, a touch end signal indicating an end of a touch by the user, and coordinates data indicating a touch position that the user touches. Therefore, the processor 30 can determine which icon or key is touched by the user based on the coordinates data.

In the embodiment, the touch panel 16 is of an electrostatic capacitance system that detects a change of an electrostatic capacitance between electrodes, which occurs when an object such as a finger is in close to a surface of the touch panel 16, and it is detected that one or more fingers are brought into contact with the touch panel 16, for example. Furthermore, the touch panel 16 is provided on the display 14, and serves as a pointing device for designating an arbitrary position within the screen. The touch panel control circuit 48 functions as a detecting module, and, more specifically, detects a touch operation within a touch-effective range of the touch panel 16, and outputs coordinates data indicative of a position of the touch operation to the processor 30. That is, the user inputs to the mobile phone 10 an operation position, an operation direction and so on through a touch, slide or release operation or through a combination of these operations on the surface of the touch panel 16.

In addition, for a detection system of the touch panel 16, a surface-type electrostatic capacitance system may be adopted, or a resistance film system, an ultrasonic system, an infrared ray system, an electromagnetic induction system or the like may be adopted. Furthermore, a touch operation is not limited to an operation by a finger, may be performed by a stylus or the like.

Figure 3:
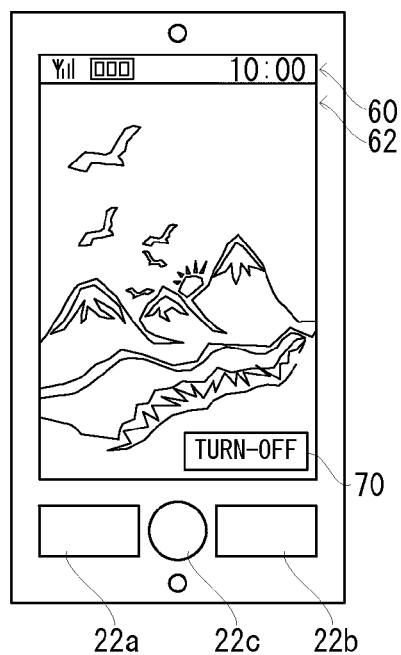
FIG. 3 is an illustrative view showing an example of a stand-by screen that is displayed on a display shown in FIG. 1.

FIG. 3 is an illustrative view showing an example of a stand-by screen that is displayed on the display 14. A displaying range of the display 14 includes a status displaying area 60 and a function displaying area 62. In the status displaying area 60, an icon (picto) showing a radio-wave receiving status by the antenna 34, an icon showing a residual battery capacity of a secondary battery and a day and time are displayed. Furthermore, in the function displaying area 62, a stand-by image that indicates that a screen is a stand-by screen and a turn-off key 70 (first key) are displayed. If the menu key 22c is operated when a predetermined function is being performed, the predetermined function is terminated and the stand-by screen and the turn-off key 70 are displayed on the display 14. Then, if the menu key 22c is operated in the stand-by screen, a menu screen is displayed. In addition, since the turn-off key 70 will be described later, a detailed description is omitted here.

In this embodiment, the display 14 is completely turned off if a first condition is satisfied, and the display 14 is temporarily turned off if a second condition is satisfied.

Figure 4:
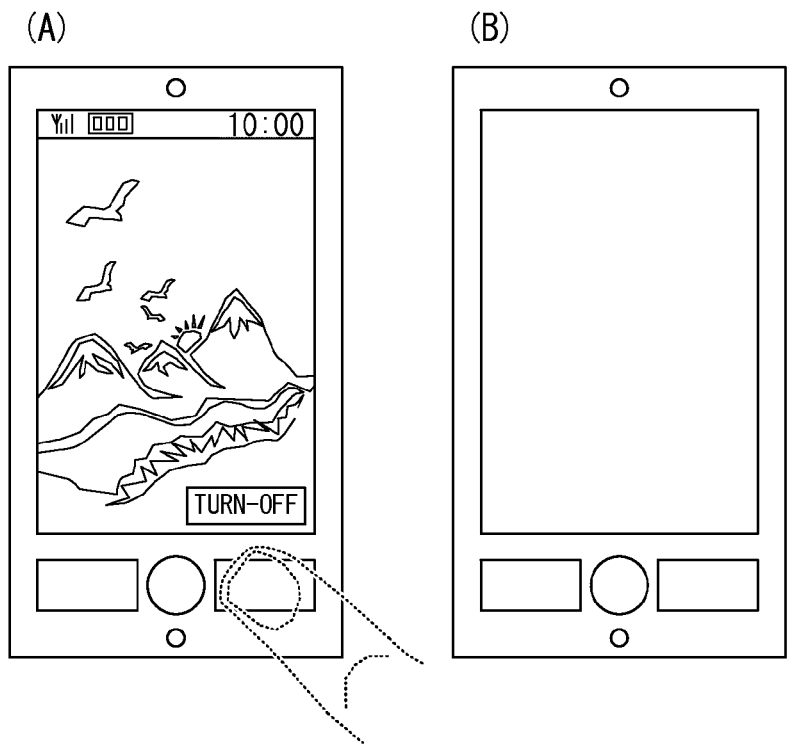
FIG. 4 shows an example of a procedure at a time that a display shown in FIG. 1 is completely turned off.

With referring to FIGS. 4(A) and 4(B), an operation to the end key 22b is included in the first condition. If the end key 22b is operated, for example, the display 14 is completely turned off and becomes a stand-by state. Furthermore, if the display 14 is completely turned off, the power of the display 14 and the backlight is turned off, and therefore, a screen (image) that is being displayed is non-displayed. Then, if the display 14 is completely turned off and becomes the stand-by state, a screen lock state that a part of the touch operation is invalidated is set. In addition, in the screen lock state in this embodiment, the power for at least one of the touch panel 16 and the touch panel control circuit 48 is turned off, and therefore, the touch operation is invalidated. However, in other embodiments, the processing that the processor 30 does not receive the coordinates of the touch position output from the touch panel control circuit 48 may be performed.

With referring to FIGS. 5(A) and 5(B), if the end key 22b is operated again in a state that the screen lock state is set, a screen lock screen is displayed on the display 14. An object Ob is displayed in the screen lock screen.

With refereeing to FIGS. 6(A) to 6(C), if the user performs a touch operation to the object Ob in a manner that a locus intersects the object Ob, a displaying manner of the object Ob is changed and the screen lock state is canceled. If the screen lock state is canceled, a previous screen before the display 14 is turned off (the stand-by screen shown in FIG. 3) is displayed on the display 14.

Next, a temporal turning off of the display 14 will be described. In this embodiment, in a state that the display 14 is temporarily turned off, the user can restore the displaying of the display 14 in the original state thereof without the canceling operation for the screen lock state.

With referring to FIGS. 7(A) and 7(B), an operation to the turn-off key 70 is includes in the second condition. If a touch operation to the turn-off key 70 is performed in a state that a displaying screen of a received mail (FIG. 7(A)), for example, the display 14 is temporarily turned off (FIG. 7(B)). At this time, the processing for setting the screen lock state is invalidated.

With referring to FIGS. 8(A) and 8(B), if the end key 22b is operated in a state that the display 14 is temporarily turned off (FIG. 8(A)), the screen lock screen is not displayed and the displaying screen of a received mail is displayed on the display 14 (FIG. 8(B)). That is, if the end key 22b is operated in a state that the display 14 is temporarily turned off, even if a canceling operation for the screen lock state is not performed, a previous screen (a last time screen) before the display 14 is turned off.

In a case where the user is called out by another person at a time that the user confirms a received mail that does not want to be read to other persons, for example, the user can make the received mail not to be displayed by temporarily turning off the display 14. Then, if the person who called out the user is leaves, the user can restart the confirmation of the received mail without performing the canceling operation of the screen lock state.

On the other hand, in a case where the user stops the use of the mobile phone 10 and puts the mobile phone 10 into a baggage or pocket, by setting the screen lock state through the operation of the end key 22b, the user can make a malfunction not occur in the baggage.

Thus, the user can easily decide whether the screen lock state is to be set according to the situation using the mobile phone 10. Especially, by operating the turn-off key 70, the user can prevent the processing to set the screen lock state from being performed.

Furthermore, it can be considered that the user puts the mobile phone 10 into the baggage while forgetting the display is being temporarily turned off. In such a situation, if the end key 22b is pushed, a malfunction occurs in the baggage. Then, in this embodiment, when a predetermined time period (30 seconds, for example) elapses from a time that the display is temporarily turned off, the display 14 is brought into a completely turned off state. That is, even if the user forgets the setting of the screen lock state, the screen lock state can be automatically set.

Furthermore, in a case where it is set such that the screen lock state can be canceled only when a personal identifications number is input or a specific touch operation is performed is performed, if the mobile phone 10 is left while forgetting the display 14 is temporarily turned off, it is feared that the mobile phone 10 is used by the third person. However, even if the mobile phone 10 is in a state that the display 14 is temporarily turned off, since the mobile phone 10 is transited to a state that the display 14 is completely turned off when the predetermined time period elapses, the mobile phone 10 is automatically brought into a security protected state.

In addition, a screen that is displayed at a time that the display 14 is completely turned off or temporarily turned off is not limited to the stand-by screen or the displaying screen of the received mail. That is, even if the screen that another function is performed is being displayed, the user can completely or temporarily turn off the display 14.

Furthermore, in other embodiments, the turn-off key 70 may be displayed in the status displaying area 60 so as to make the turn-off key 70 not obstruct the displaying content in the function displaying area 62. That is, in the other embodiments, it is possible to utilize an entire displaying range of the function displaying area 62.

Figure 9:
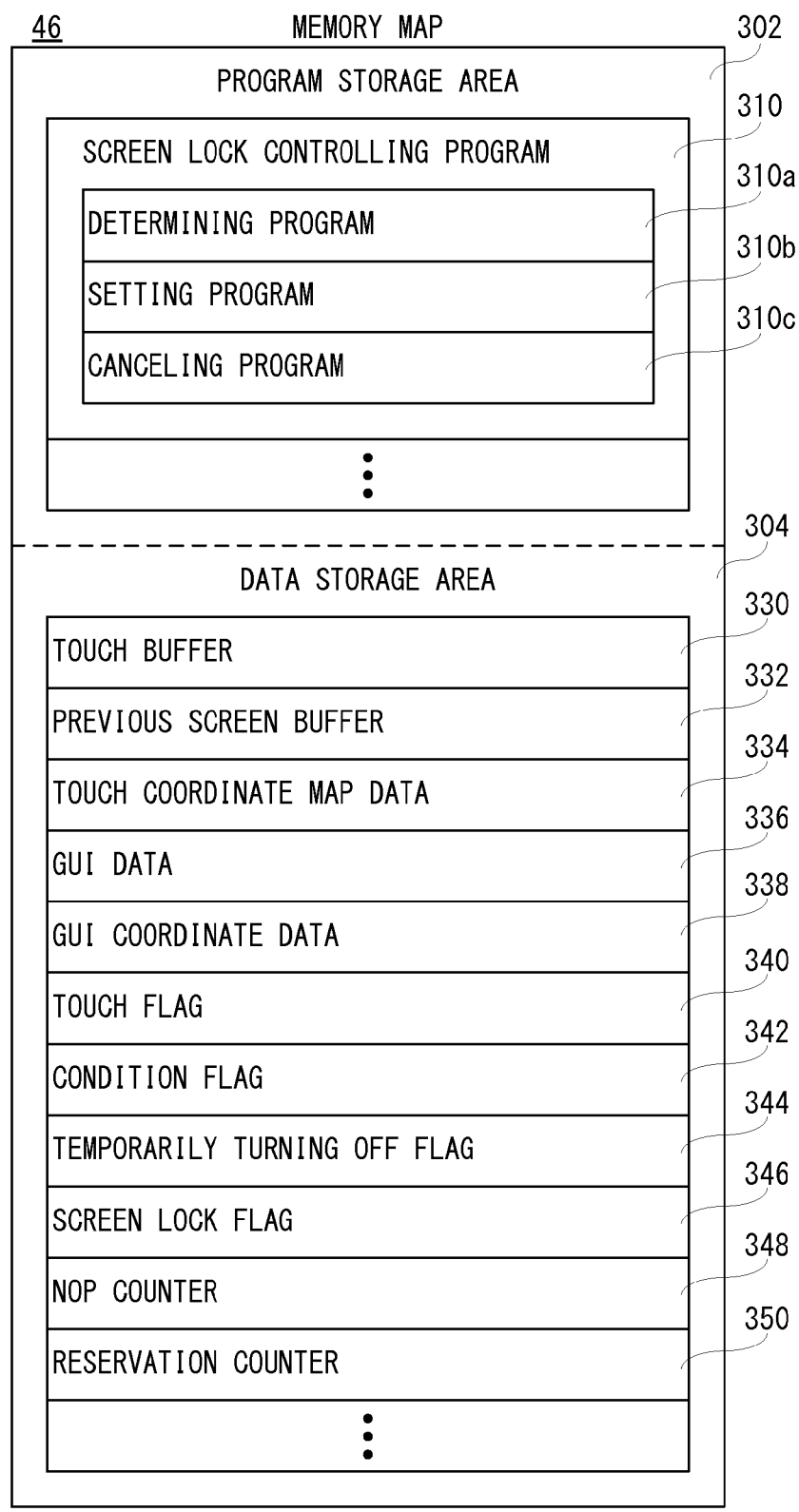
FIG. 9 is an illustrative view showing an example of a memory map of a RAM shown in FIG. 2.

In the above, the features of the embodiment are outlined, and in the following, the embodiment will be described in detail using a memory map of the RAM 46 of the mobile phone 10 as shown in FIG. 9 and flowcharts to be executed by the processor 30 of the mobile phone 10 shown in FIG. 10 to FIG. 12.

With referring FIG. 9, the RAM 46 shown in FIG. 2 is formed with a program storage area 302 and a data storage area 304. As previously described, the program storage area 302 is an area for reading and storing a part or a whole of program data that is set in advance in the flash memory 44 (FIG. 2).

A screen lock state controlling program 310 for performing the setting and the canceling of the screen lock state, etc. are stored in the program storage area 302. In addition, the screen lock state controlling program 310 includes a determining program 310a for determining whether the display 14 is to be temporarily turned off, a setting program 310b for setting the screen lock state and a canceling program 310c for canceling the screen lock state.

In addition, the program storage area 302 further includes programs for performing a telephone function, etc.

The data storage area 304 of the RAM 46 is provided with a touch buffer 330 and a previous screen buffer 322, and stored with touch coordinates map data 334, GUI data 336 and GUI coordinates data 338. The data storage area 304 is further provided with a touch flag 340, a condition flag 342, a temporarily turning off flag 344, a screen lock flag 346, a NOP (No-operation) counter 348 and a reservation counter 350.

The touch buffer 330 is stored with touch coordinates data that is output from the touch panel control circuit 48. The previous screen buffer 332 is temporarily stored with data of a screen that was displayed before the display 14 is turned off.

The touch coordinates map data 334 is data for mapping touch coordinates of the touch operation and displaying coordinates of the display 14 with each other. That is, a result of the touch operation performed to the touch panel 16 is reflected in the displaying of the display 14 based on the touch coordinates map data 334.

The GUI data 336 includes image data and character string data for displaying the key(s), etc. that are to be displayed on the display 14. The GUI coordinates data 338 includes displaying coordinates data of the GUI that is being displayed.

The touch flag 340 is a flag for determining whether a touch to the touch panel 16 is performed. The touch flag 340 is constructed by a 1-bit register, for example. If the touch flag 340 is turned-on (true), a data value "1" is set in the register, and if the touch flag 340 is turned-off (false), a data value "0" is set in the register. In addition, the touch flag 340 is switched on/off based on a signal that the touch panel control circuit 48 outputs.

The condition flag 342 is a flag indicating that the second condition is satisfied, which is turned on by the processing of the determining program 310a. The temporarily turning off flag 344 is a flag for determining whether the display 14 is temporarily turned off. The screen lock flag 346 is a flag for determining whether the screen lock state is set.

The NOP counter 348 is a counter for measuring a time period of a state that the mobile phone 10 is not operated (no operation state). If the touch operation or the key operation is performed to the mobile phone 10, for example, the NOP counter 348 is initiated (reset) and starts measuring a time and expires when a predetermined time period (60 seconds, for example) elapses. Therefore, the NOP counter 348 may be called as a NOP timer.

The reservation counter 350 is a counter for measuring a time period from a time that the display 14 is temporarily turned off. If the display 14 is temporarily turned off, for example, the reservation counter 350 is initiated (reset) and starts measuring a time and expires when a predetermined time period (30 seconds, for example) elapses. Therefore, the reservation counter 350 may be called as a reservation timer.

The data storage area 304 is stored with the image data that is displayed in the stand-by state, data of character strings, and provided with counters and flags necessary for operation of the mobile phone 10.

Figure 10:
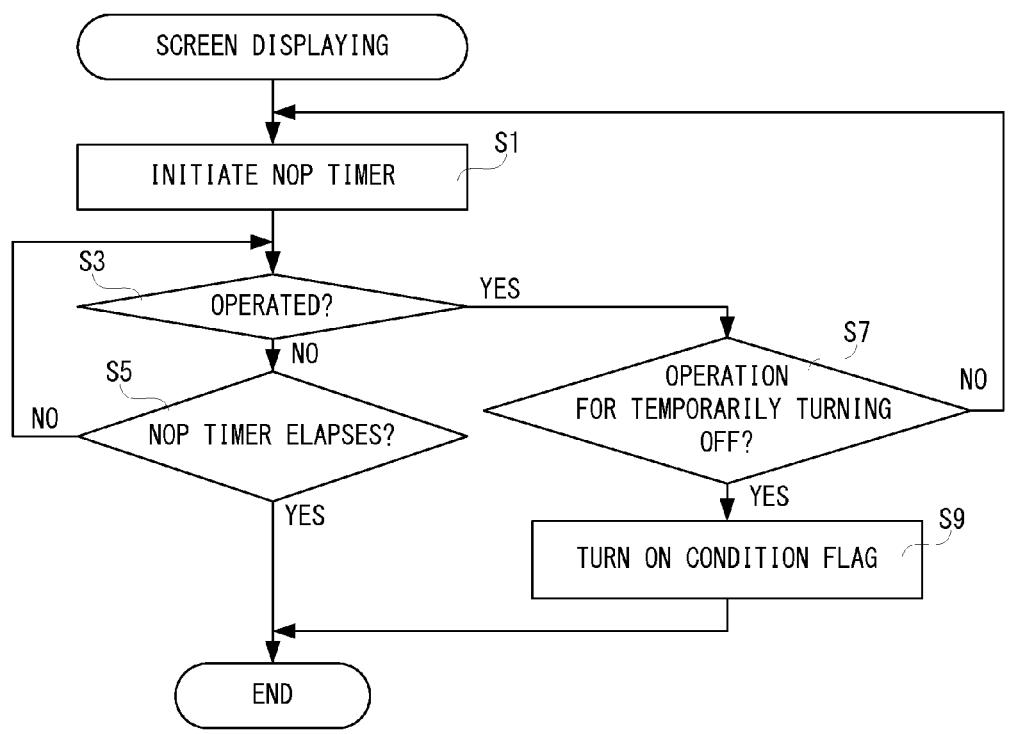
FIG. 10 is a flowchart showing an example of a determining process by a processor shown in FIG. 2.
Figure 11:
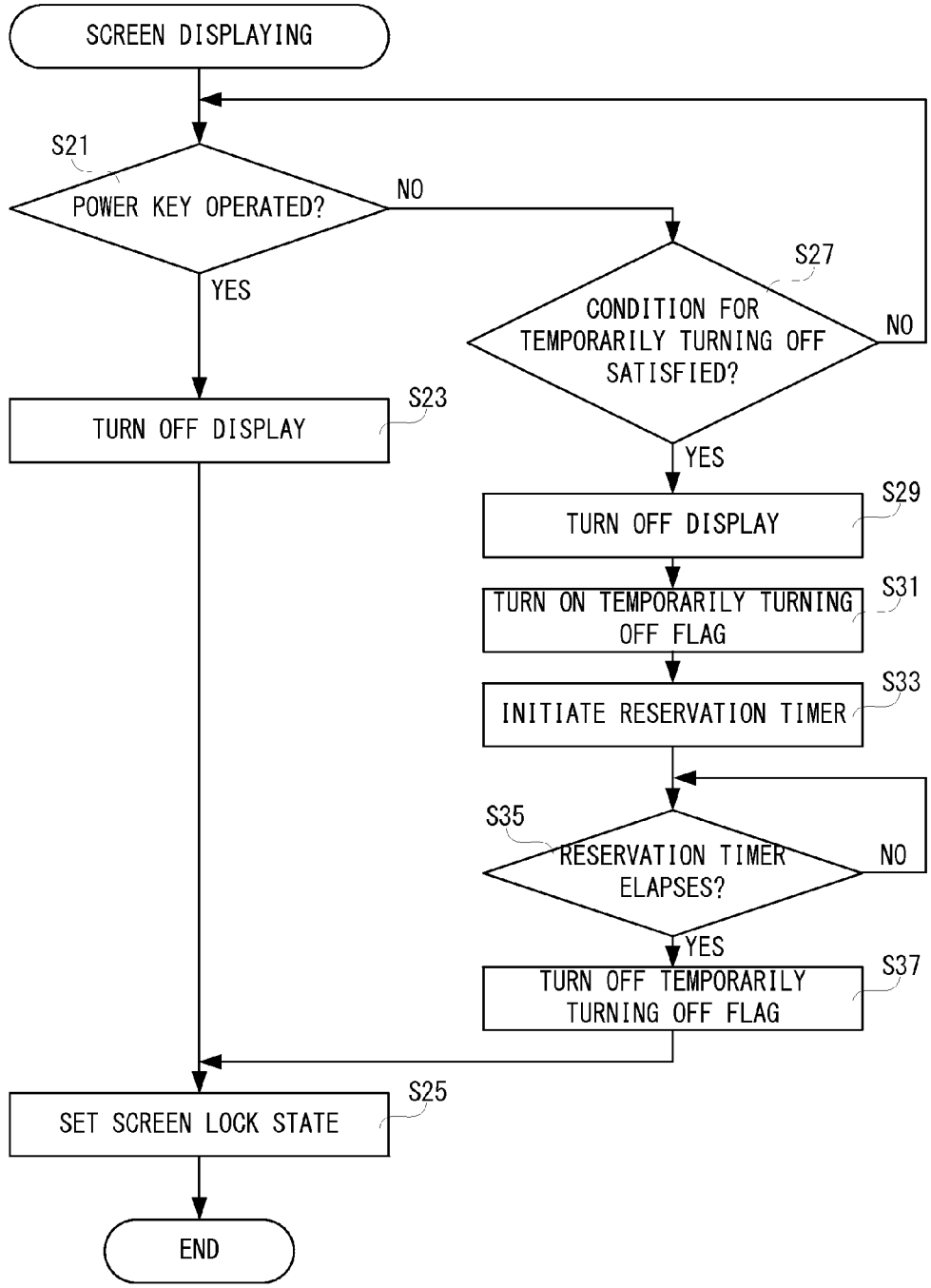
FIG. 11 is a flowchart showing an example of a setting process by the processor shown in FIG. 2 in a first embodiment.
Figure 12:
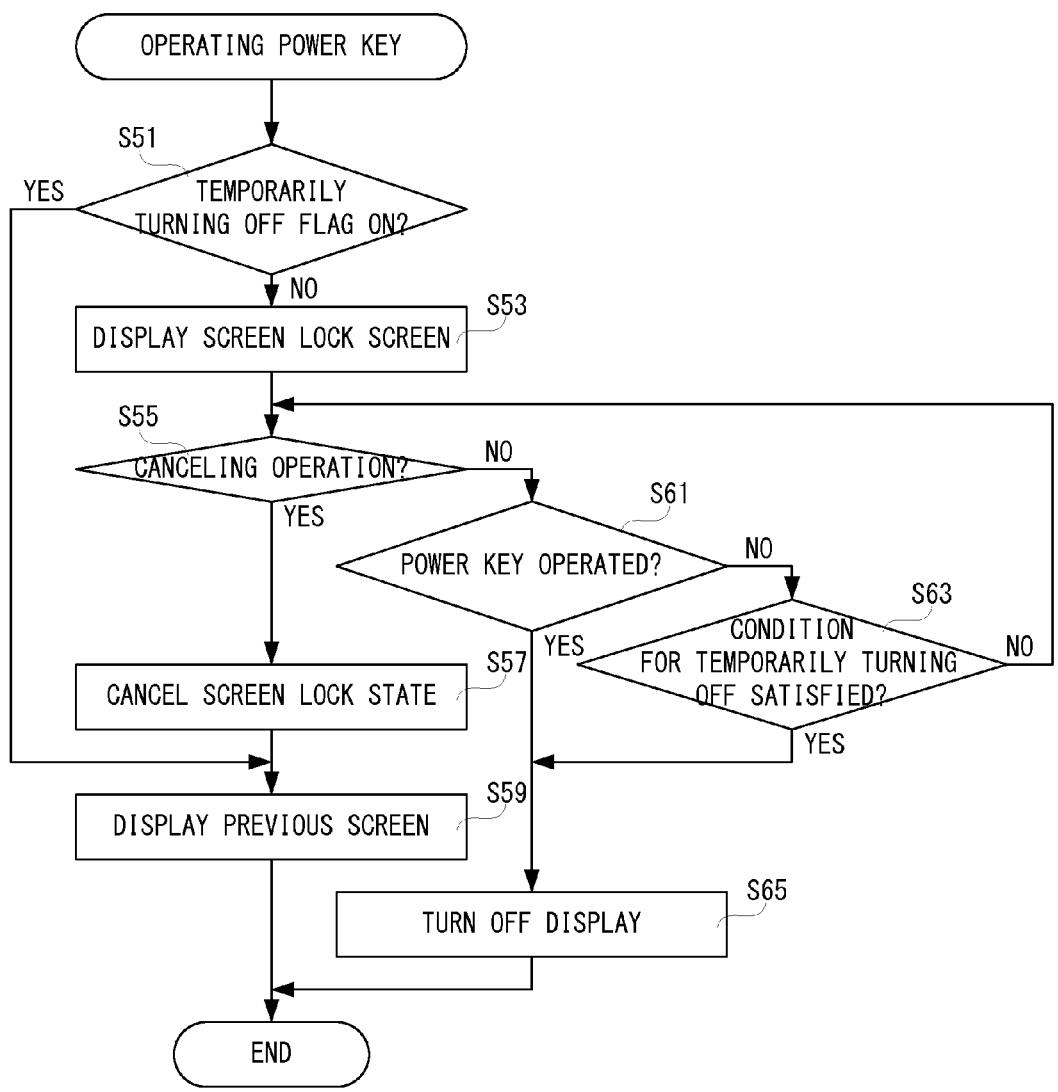
FIG. 12 is a flowchart showing an example of a canceling process by the processor shown in FIG. 2 in the first embodiment.

The processor 30 processes a plurality of tasks including a determining process shown in FIG. 10, a setting process shown in FIG. 11, and a canceling process shown in FIG. 12, etc., in parallel with each other under controls of Linux (registered trademark)-base OS such as Android (registered trademark) and REX, or other OSs.

With referring to FIG. 10, the determining process is started if the stand-by screen is displayed 14. In a step S1, the processor 30 initiates the NOP timer. That is, the NOP counter 348 is initiated to start measuring of a time period of a NOP state. Subsequently, in a step S3, the processor 30 determines whether an operation is performed. That is, it is determined whether the touch operation or the key operation is performed. If "NO" is determined in the step S3, that is, if there is no user's operation, in a step S5, the processor 30 determines whether the NOP timer expires. That is, the processor 30 determines whether the predetermined time period (60 seconds, for example) elapses from a time that a last operation is performed. If "NO" is determined in the step S5, that is, if the NOP timer does not expire, the process by the processor 30 returns to the step S3. If "YES" is determined in the step S5, that is, if the predetermined time period elapses in the NOP state, the processor 30 terminates the determining process.

On the other hand, if "YES" is determined in the step S3, that is, if the touch operation or the key operation is performed by the user, for example, the processor 30 determines whether the operation is an operation for temporarily turning off in a step S7. That is, it is determined whether the touch operation is performed to the turn-off key 70. Specifically, the processor 30 determines whether the start coordinates and the end coordinates of the touch operation that are stored in the touch buffer 330 are included within the displaying coordinates range of the turn-off key 70 that is stored in the GUI coordinates data 338. If "NO" is determined in the step S7, that is, if the turn-off key 70 is not operated, the process by the processor 30 returns to the step S1. If "YES" is determined in the step S7, that is, if the turn-off key 70 is operated, the processor 30 turns on the condition flag 342 in a step S9 to terminate the determining process. That is, the condition flag 342 is turned on as the second condition is satisfied.

With referring to FIG. 11, the setting process is started when the stand-by screen is displayed on the display 14. In a step S21, the processor 30 determines whether the power key (end key 22b) is operated. If "YES" is determined in the step S21, that is, if the end key 22b is operated, for example, in a step S23, the processor 30 turns off the display 14. More specifically, after the data of the screen that is currently displayed is saved in the previous screen buffer 332, the power for the display 14, the backlight and the touch panel 16 is turned off. Subsequently, in a step S25, the processor 30 sets the screen lock state to terminate the setting process. That is, the screen lock flag 346 is turned on. In addition, the processor 30 performing the processing of the step S25 functions as a setting module.

On the other hand, if "NO" is determined in the step S21, that is if the power key (end key 22b) is not operated, the processor 30 determines in a step S27 whether a condition for temporarily turning off is satisfied. If "NO" is determined, that is, if the condition for temporarily turning off is not satisfied, the process by the processor 30 returns to the step S21.

If "YES" is determined in the step S27, that is, if the turn-off key 70 is operated and thus the condition for temporarily turning off is satisfied, for example, in a step S29, the processor 30 turns off the display 14 as similar to the step S23. Subsequently, in a step S31, the processor 30 turns on the temporarily turning off flag. In addition, the processor 30 performing the processing in the step S29 functions as a turning off module and the processor 30 performing the processing of the step S31 functions as an invalidating module.

Subsequently, the processor 30 initiates the reservation timer in a step S33. That is, the reservation counter 350 is initiated to measure a time period from a time that the display is temporarily turned off. Next, the processor 30 determines in a step S35 whether the reservation timer expires. That is, the processor 30 determines whether the predetermined time period elapses after the display 14 is temporarily turned off. In addition, the processor 30 performing the processing in the steps S33 and S35 functions as a measuring module.

If "NO" is determined in the step S35, that is, if the predetermined time period does not elapse after the temporarily turning off, the processor 30 repeats the processing of the step S35. If "YES" is determined in the step S35, that is, if the predetermined time period elapses after the temporarily turning off, the processor 30 turns off the temporarily turning off flag 344 in a step S37 and sets the screen lock state in the step S25. That is, since the predetermined time period elapses from a time that the display 14 is temporarily turned off, the screen lock state is set and the mobile phone 10 transits to a completely turned off state.

With referring to FIG. 12, the canceling process is started when the end key 22b is operated in a state that the display 14 is turned off. In a step S51, the processor 30 determines whether the temporarily tuning off flag 344 is turned on. That is, it is determined whether it is in a state that the display 14 is temporarily turned off. If "YES" is determined in the step S51, that is, if the display 14 is temporarily turned off, the processor 30 displays the previous screen in a step S59 to terminate the canceling process. In a case where the data of the displaying screen of the received mail is stored in the previous screen buffer 332, for example, in the step S59, the displaying screen of the received mail is displayed on the display 14. In addition, in a case where "YES" is determined in the step S51, the temporarily turning off flag 344 is turned off.

On the other hand, if "NO" is determined in the step S51, that is, in a case where the display 14 is completely turned off, the processor 30 displays the screen lock screen. More specifically, the processor 30 reads the GUI data 336 to display the screen lock screen shown in FIG. 5(B) on the display 14. Subsequently, the processor 30 determines in a step S55 whether the canceling operation is performed. For example, the processor 30 determines whether the canceling operation that the locus of the touch operation intersects the object Ob as shown in FIGS. 6(A) and 6(B) is performed. If "YES" is determined in the step S5, that is, if the canceling operation is performed, in a step S57, the processor 30 cancels the screen lock state. That is, the screen lock flag 346 is turned off. Subsequently, the processor 30 displays the previous screen in a step S59. Them if the processing in the step S59 is ended, the processor terminates the canceling process.

Furthermore, if "NO" is determine din the step S55, that is, if the cancelling operation is not performed, in a step S61, the processor 30 determines whether the power key (end key 22b) is operated. If "YES" is determined in the step S61, that is, if the power key is operated, in a step S65, the processor 30 turns off the display 14 as similar to the step S23. Then, if the processing in the step S65 is ended, the processor 30 terminates the canceling process. That is, in a case where the power key is operated in a state that the screen lock screen is displayed, the display 14 is turned off again.

If "NO" is determined in the step S61, that is, if the power key is not operated, the processor 30 determines in a step S63 whether the condition for temporarily turning off is satisfied. That is, it is determined whether the condition flag 342 is turned on. If "NO" is determined in the step S63, that is, if the condition for temporarily turning off is not satisfied, the process by the processor 30 returns to the step S55. If "YES" is determined in the step S63, that is, if the condition for temporarily turning off is satisfied, the processor 30 turns off the display 14 in a step S65 to terminate the canceling process.

In addition, the processor 30 performing the processing of the step S53 functions as a screen lock screen displaying module, the processor 30 performing the processing in the step S57 functions as a canceling module, and the processor 30 performing the processing of the step S59 functions as a displaying processing module.

In addition, in the first embodiment, the key operation that functions as an execution trigger of the canceling process is not limited to the end key 22b and thus may be another key, etc. Furthermore, the telephone call, incoming mail, etc. may function as the execution trigger for the canceling process rather than the key operation, <Second Embodiment>

In the second embodiment, a mobile phone 10 has a security function, and can perform a specific function displaying private information of the user. Then, if the security function is validated when the display 14 is temporarily turned off in a state that the specific function is performed, a security lock state that the use of the specific function is restricted is set. In addition, the mobile phone 10 is the same or approximately the same as the mobile phone in the first embodiment, an appearance of the mobile phone 10 and a description of the electrical structure thereof will be omitted here.

Figure 13:
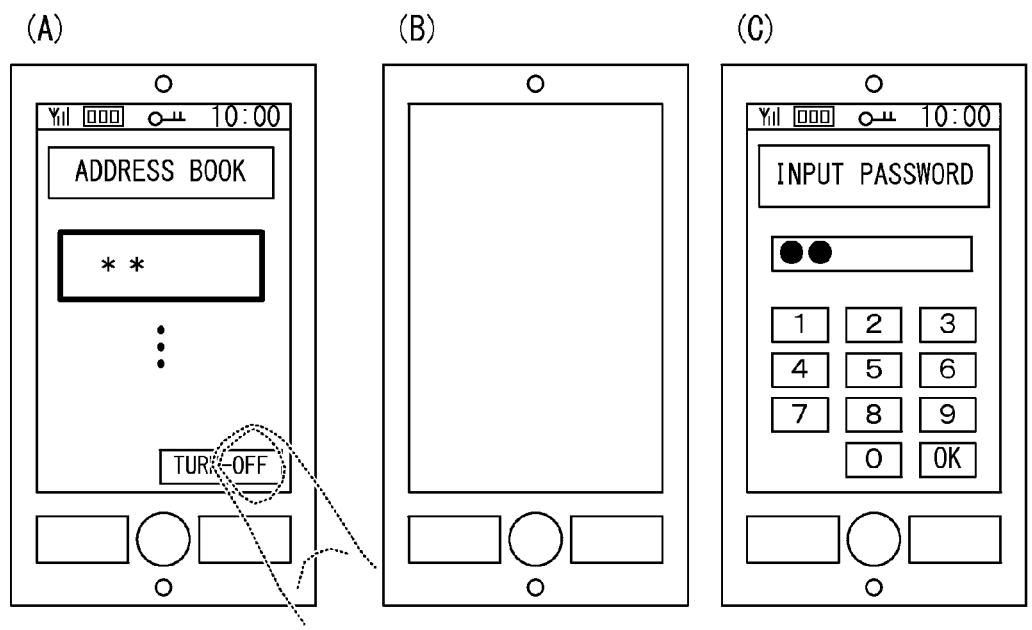
FIG. 13 shows another example of a procedure at a time that the display shown in FIG. e1 is temporarily turned off.

With referring to FIGS. 13(A) and 13(B), if an address book function is performed as the specific function, an address book screen including address book data ("**") that is the private information is displayed on the display 14. If the turn-off key 70 is operated in this state, the display 14 is temporarily turned off and the security lock state is set. Next, with referring to FIG. 13(C), if the end key 22b is operated in a state that the display 14 is temporarily turned off, the security lock screen is displayed on the display 14. In the security lock screen in the second embodiment, the user is requested to input a personal identification number as a specific canceling operation. Then, if the personal identification number that is registered in advance is input and authentication of the personal identification number is succeeded, the security lock state is canceled. When the security lock state is canceled, as similar to the first embodiment, the screen (address book screen) that was displayed before the temporarily turning off is displayed on the display 14.

Thus, in the second embodiment, in a case where the display 14 is temporarily turned off in a state that the private information is being displayed, in displaying the information on the display 14 again, the security lock screen that requires a specific canceling operation is displayed. Therefore, if the display 14 is temporarily turned off in a state that the specific function is performed, the mobile phone 10 can be brought into a security protected state.

Figure 14:
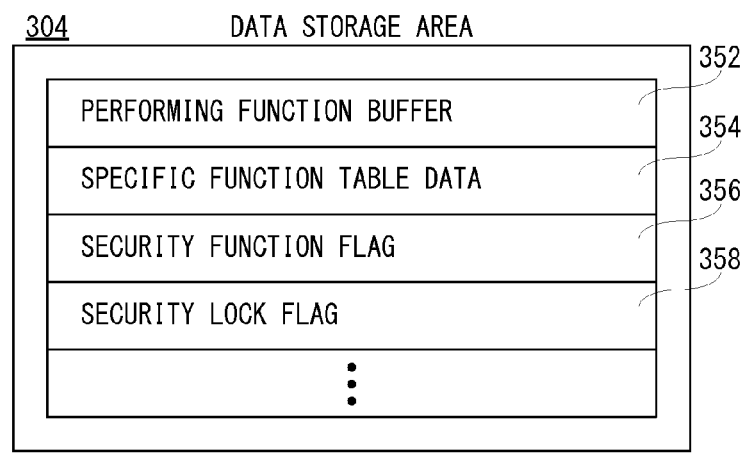
FIG. 14 is an illustrative view showing an example of a memory map of the RAM shown in FIG. 2 in a second embodiment.

With referring to FIG. 14, a memory map of the RAM 46 in the second embodiment is further provided with a performing function buffer 352 and further stored with a security function table data 354 and further provided with a security function flag 356 and a security lock flag 358 in addition to the buffers, data and counters in the memory map (FIG. 9) of the first embodiment.

The performing function buffer 352 is temporarily stored with an ID of a function being performed or the like. The specific function table data 354 is stored with an ID of a function that is registered in advance as the specific function. The security function flag 356 is a flag for determining whether the security function is validated. The security lock flag 358 is a flag for determining whether the security lock state is set.

Figure 15:
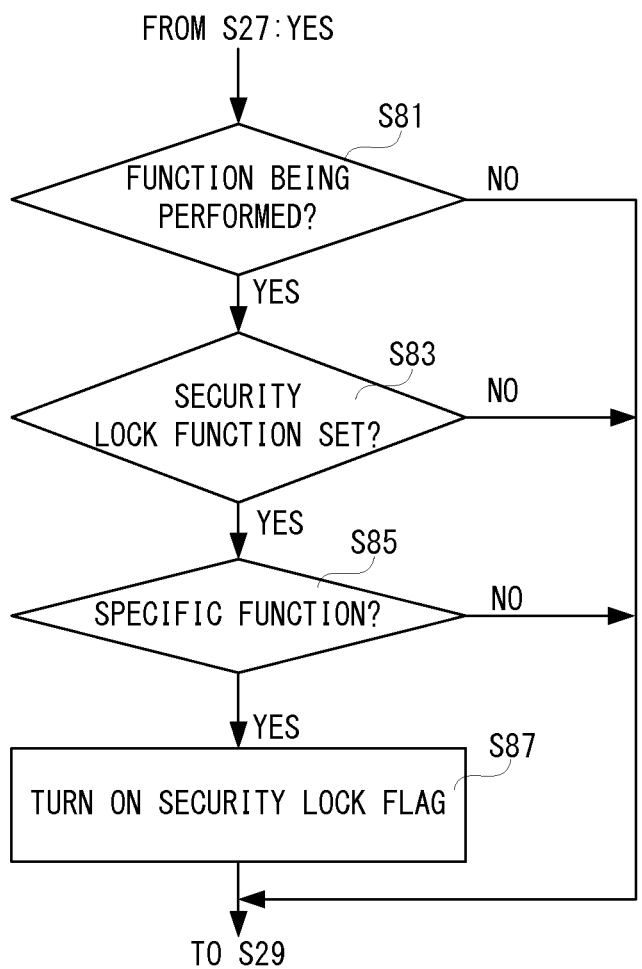
FIG. 15 is a flowchart showing an example of a part of a setting process by the processor shown in FIG. 2 in the second embodiment.

FIG. 15 is a flowchart of a part of the setting process in the second embodiment. In addition, since the steps S21 to S27 are the same as those of the first embodiment, illustration and a description thereof are omitted here.

If the condition for temporarily turning off is satisfied in the second embodiment, for example, and thus, "YES" is determined in the step S27, in a step S81, the processor 30 determines whether any function is performed. That is, the processor 30 determines whether an ID indicative of a function is stored in the performing function buffer 352. If "NO" is determined in the step S81, that is, if no function is performed, the process by the processor 30 proceeds to the step S29.

In addition, if "YES" is determined in the step S81, that is, if the function is performed, in a step S83, the processor 30 determines whether the security function is set. That is, it is determined whether the security setting flag 356 is turned on. If "NO" is determined in the step S83, that is, if the security function is not set, the process by the processor 30 proceeds to the step S29.

Furthermore, if "YES" is determined in the step S83, that is, if the security function is set, the processor 30 determines in a step S85 whether the specific function that is performed. Specifically, the processor 30 determines whether the ID stored in the performing function buffer 352 is recorded in the specific function table dada 354. If "NO" is determined in the step S85, that is, if the specific function is not performed, the process by the processor 30 proceeds to the step S29. On the other hand, if "YES" is determined in the step S85, that is, the specific function is performed, in a step S87, the processor 30 turns on the security lock flag 358. That is, the security lock state is set. Then, the processor 30 performs the processing after the step S29. In addition, the processor 30 performing the processing in the step S87 functions as a security lock setting module.

Figure 16:
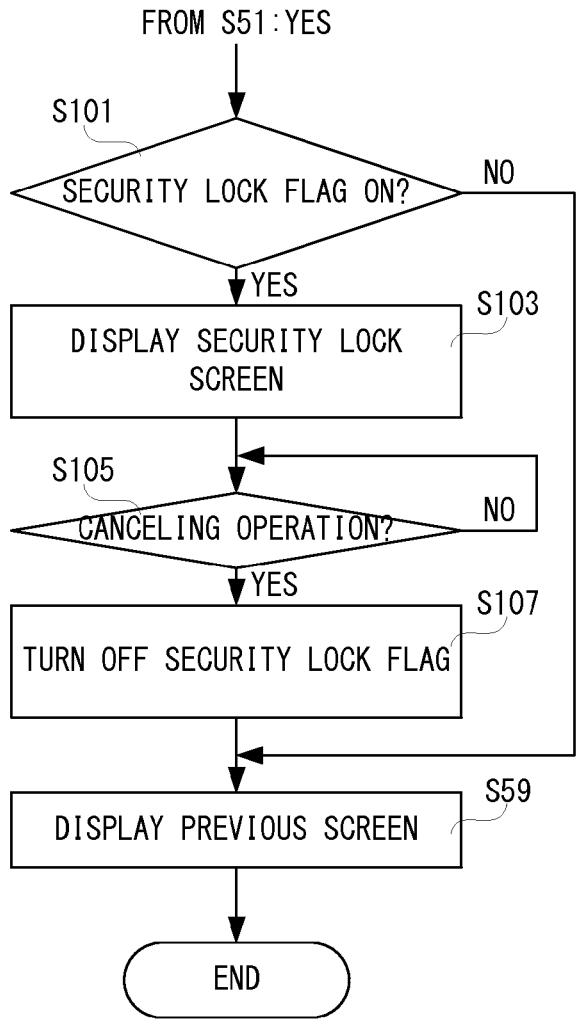
FIG. 16 is a flowchart showing an example of a part of a canceling process by the processor shown in FIG. 2 in the second embodiment.

FIG. 16 is a flowchart of a part of a canceling process in the second embodiment. In addition, since the steps S51 to S57 and S61 to S65 are the same as those of the first embodiment, illustration and a description thereof are omitted here.

If the temporarily turning off flag is turned on, and then, "YES" is determined in the step S51, in a step S101, the processor 30 determines whether the security lock flag 358 is turned on. That is, it is determined whether the security lock state is set. If "NO" is determined in the step S101, that is, if the security lock state is not set, the process by the processor 30 proceeds to the step S59. If "YES" is determined in the step S101, that is, if the security lock state is set, in a step S103, the processor 30 displays the security lock screen on the display 14. The security lock screen shown in FIG. 13(C), for example is displayed on the display 14. In addition the processor 30 performing the processing in the step S103 functions as a security lock screen displaying module.

Subsequently, the processor 30 determines in a step S105 whether the canceling operation is performed. The processor 30 determines whether a personal identification number that is input is coincident with the personal identification number that is registered with each other, for example. If "NO" is determined in the step S105, that is, if a correct personal identification number is not input, the processor 30 repeats the processing of the step S105.

If "YES" is determined in the step S105, that is, if the personal identification number that is input is coincident with the personal identification number that is registered with each other, in a step S107, the processor 30 turns off the security lock flag 358. That is, the security lock state is canceled. Then, the processor 30 displays the previous screen in the step S59 to terminate the canceling process. In addition, the processor 30 performing the processing in the step S107 functions as a security lock canceling module.

In addition, in the second embodiment, if the display 14 is completely turned off in a state that the security lock state is effectively set, the security lock state is also set in addition to the screen lock state. Then, the screen lock state is canceled, the security lock screen is displayed. In such a case, in the setting process, the processing in the steps S81-S85 is performed between the step S21 and the step S23. Furthermore, in the canceling process, the steps S101-S107 after the step S57.

Furthermore, in other embodiments, irrespective of validation/invalidation of the security lock function, the security lock state may be set together with the screen lock state.

<Third Embodiment>

In the third embodiment, in a case where the screen lock state is set in a state that an arbitrary function is performed, even if the menu key 22*c* is operated, the screen lock screen is displayed. Accordingly, the user can know that an arbitrary function is performed even if the screen lock state is set. In addition, the mobile phone 10 is the same or approximately the same as the mobile phone in the first embodiment, an appearance of the mobile phone 10 and a description of the electrical structure thereof will be omitted here.

Figure 17:
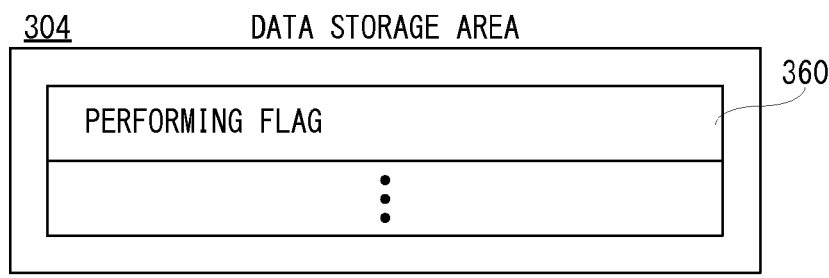
FIG. 17 is an illustrative view showing an example of a memory map of the RAM shown in FIG. 2 in a third embodiment.

With referring to FIG. 17, a memory map of the RAM 46 in the third embodiment is further provided with a performing flag 360 that indicates that an arbitrary function is being performed in addition to the flags in the memory maps (FIG. 9 and FIG. 14) of the first embodiment and the second embodiment.

Figure 18:
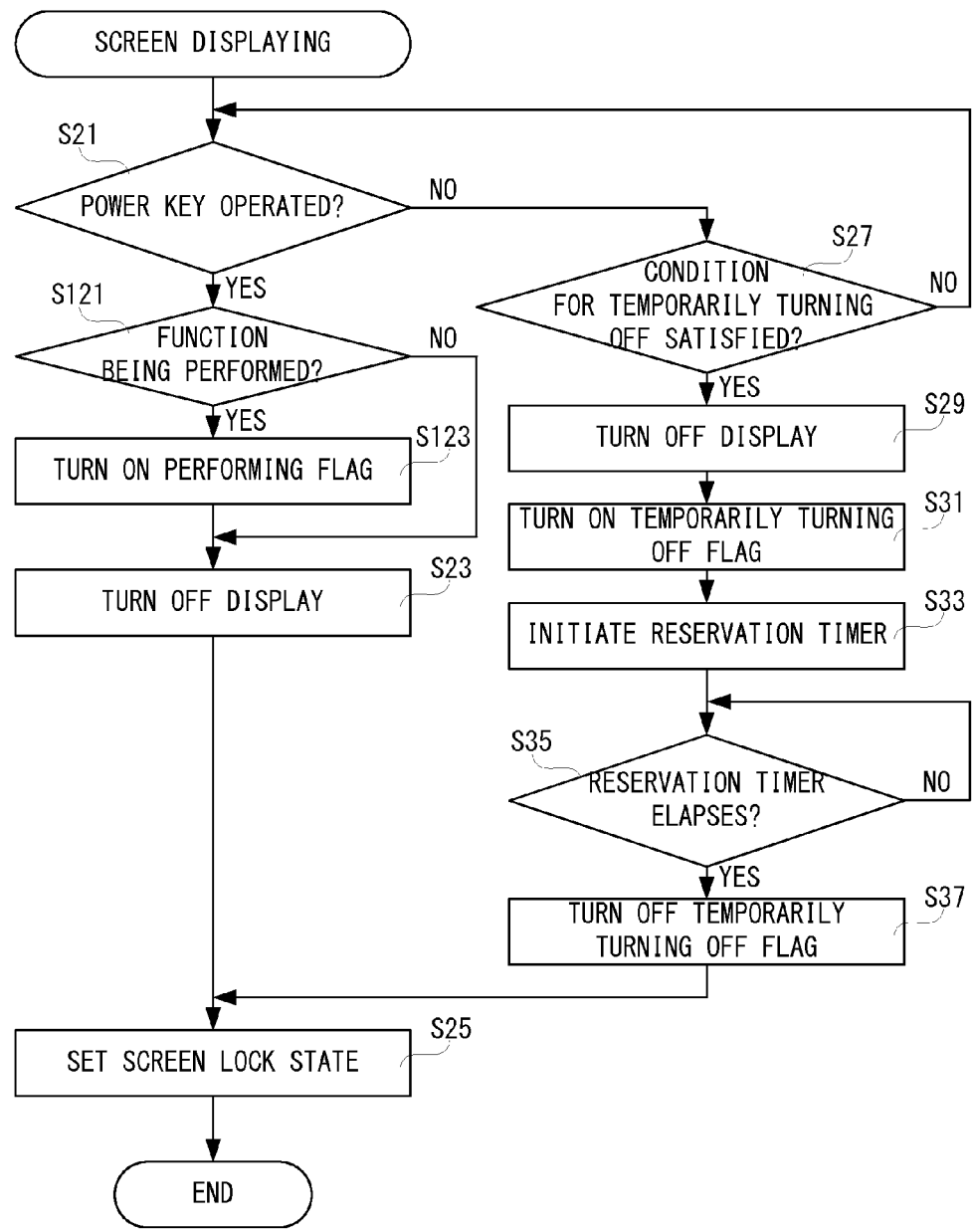
FIG. 18 is a flowchart showing an example of a setting process by the processor shown in FIG. 2 in the third embodiment.

FIG. 18 is a flowchart of a part of the setting process in the third embodiment. In addition, since except that steps S121 and S123 are added between the step S21 and the step S23, the flowchart is the same as that of the first embodiment, as for the steps S21 to S37, a detailed description is omitted here.

If the power key (end key 22*b*) is operated, "YES" is determined in the step S21, and then, in the step S121, the processor 30 determines whether any function is being performed. That is, the processor 30 determines whether the ID is recorded in the performing function buffer 352. If "NO" is determined in the step S121, that is, if no function is performed, the process by the processor 30 proceeds to the step S23. On the other hand, if "YES" is determined in the step S121, that is, if an arbitrary function is being performed, in the step S123, the processor 30 turns on the performing flag 360. Then, if the processing of the step S123 is ended, the process by the processor 30 proceeds to the step S23.

Figure 19:
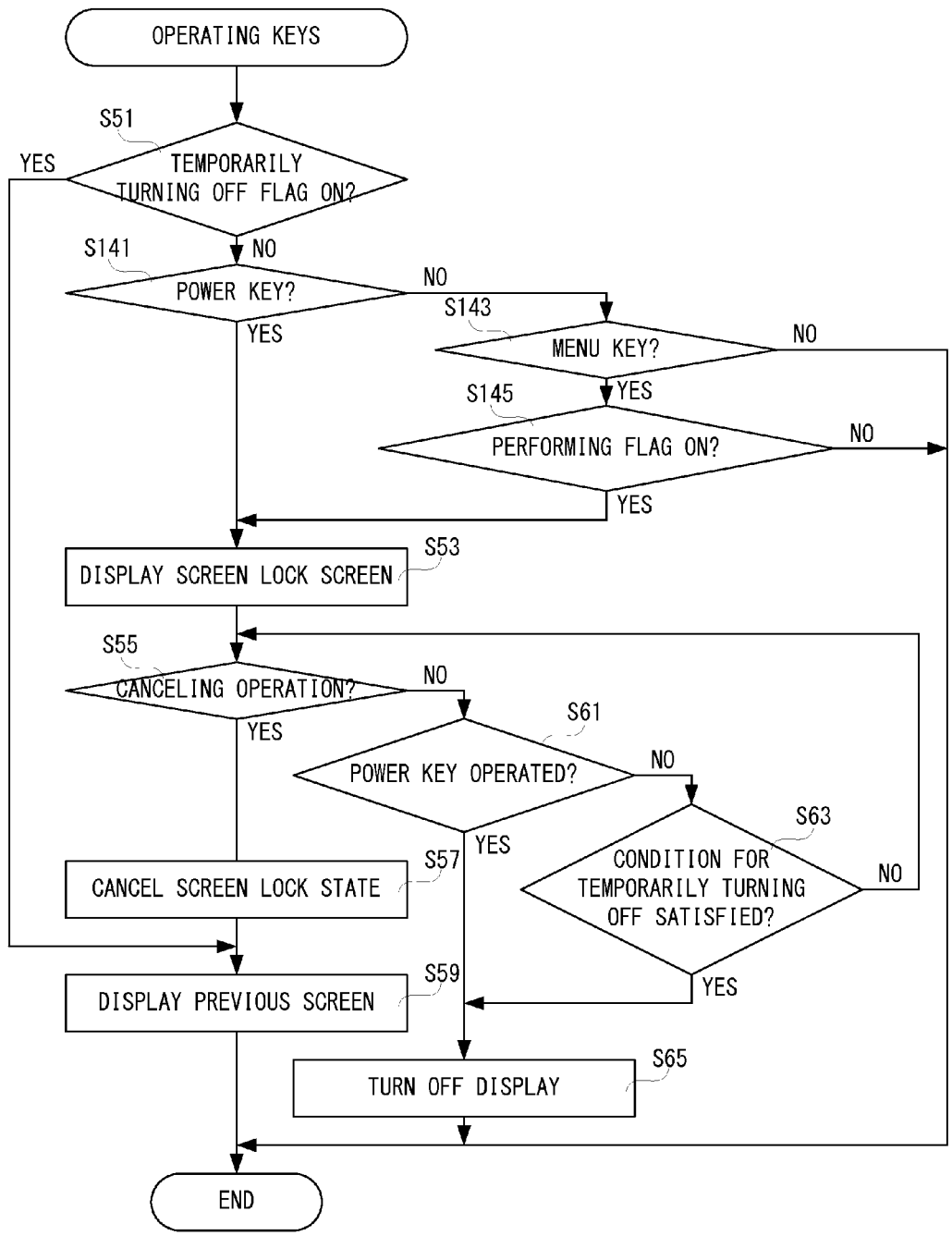
FIG. 19 is a flowchart showing an example of a canceling process by the processor shown in FIG. 2 in the third embodiment.

FIG. 19 is a flowchart of the canceling process in the third embodiment. In addition, since except that the processing in steps S141 to S145 are added between the step S51 and the step S53, the flowchart is the same as that of the first embodiment, as for the steps S51 to S65, a detailed description is omitted here.

The flowchart for canceling process in the third embodiment is started upon the key operation. Then, if the temporarily turning off flag 344 is turned off and thus "NO" is determined in the step S51, in the step S141, the processor 30 determines whether the power key is operated. That is, the processor 30 determines whether the key that is operated is the power key (end key 22*b*). If "YES" is determined in the step S141, that is, if the key that is operated is the power key, in the step S53, the processor 30 displays the screen lock screen and performs the processing after the step S55.

On the other hand, if "NO" is determined in the step S141, that is, if the key that is operated is not the power key, in a step S143, the processor 30 determines whether the key that is operated is the menu key 22*c*. If "NO" is determined in the step S143, that is, if the key that is operated is not the menu key 22*c*, the processor 30 terminates the canceling process.

If "YES" is determined in the step S143, that is, if the key that is operated is the menu key 22*c*, in the step S145, the processor 30 determines whether the performing flag 360 is turned on. That is, it is determined whether the screen lock state is set in a state that the arbitrary function is performed. If "NO" is determined in the step S145, that is, if the screen lock state is set when no function is performed, the processor 30 terminates the canceling process.

In addition, if "YES" is determined in the step S145, that is, if the screen lock state is set when the function is performed, the processor 30 displays the screen lock screen in the step S53 and performs the processing after the step S55.

In addition, the first embodiment to the third embodiment can be arbitrarily combined with each other, but specific combination is thinkable easily, and therefore, a detailed description thereof is omitted.

Furthermore, the turn-off flag 70 may be provided on the housing 12 as a hardware key rather than the software key.

In addition, in other embodiments, the second condition may include a case where a predetermined time period (60 seconds, for example) as NOP. In this case, when "YES" is determined in the step S5, the process proceeds to the step S9 and the condition flag 342 is turned on.

The programs used in the embodiments may be stored in an HDD of the server for data distribution, and distributed to the mobile phone 10 via the network. The plurality of programs may be stored in a storage medium such as an optical disk of CD, DVD, BD (Blu-ray Disc) or the like, a USB memory, a memory card, etc. and then, such the storage medium may be sold or distributed. In a case where the programs downloaded via the above-described server or storage medium are installed to a mobile terminal having the structure equal to the structure of the embodiments, it is possible to obtain advantages equal to the advantages according to the embodiments.

The specific numerical values mentioned in this specification are only examples, and changeable appropriately in accordance with the change of product specifications.

It should be noted that reference numerals inside the parentheses and the supplements show one example of a corresponding relationship with the embodiments described above for easy understanding of the present invention, and do not limit the present invention.

An embodiment is a mobile terminal, comprising: a display; a touch panel provided on the display; a detecting module operable to detect a touch operation to the touch panel; an operating module operable to receive an operation by a user; a setting module operable to set a screen lock state that a part of the operation is invalidated when a first condition is satisfied; a turning off module operable to turn off the display when a second condition is satisfied in accordance with the operation by the user; an invalidating module operable to invalidate the setting module when the display is turned off by the turning off module; and a displaying processing module operable to display on the display a previous screen before the display is turned off by the turning off module when the operating module receives the operation in a state that the setting module is invalidated.

In the embodiment, the mobile terminal (10: a reference numeral exemplifying a module corresponding in the embodiment, and so forth) comprises the display (14) on which a GUI is displayed, the touch panel (16) that is provided on the display and receives a touch operation to the GUI, etc. being is displayed on the display, a touch detecting module (48) that detects the touch operation and the operating module (40: 22, 70) that receives the operation by the user such as a key operation or a touch operation, etc. The setting module (30, S25) sets a screen lock state that a part of the touch operation (operation for performing a predetermined function, for example) is invalidated when the first condition is satisfied. If the display is turned off by the turning off module (30, S29) when the second condition is satisfied, the invalidating module (30, S31) invalidates the setting module that sets the screen lock state. Then, the displaying processing module (30, S59) displays the previous screen (stand-by screen, for example) before the display is turned off by the turning off module if the user operation is received at a time that the setting module is invalidated.

According to the embodiment, it is possible for the user to easily decide whether the screen lock state is to be set in accordance with the situation that the mobile terminal is used.

Another embodiment further comprises a measuring module operable to start measuring a time period when the display is turned off by the turning off module, wherein the invalidating module stops invalidating the setting module when a predetermined time period is measured by the measuring module.

In this embodiment, the measuring module (30, S33, S35) starts the measuring a time period after the display is turned off if the display is turned off by the turning off module when the second condition is satisfied. The invalidating module stops invalidating the setting module when the predetermined time period elapses after the display is turned off by the turning off module. As a result, the setting module sets the screen lock state.

According to this embodiment, even in a case where the display is turned off when the second condition is satisfied, the screen lock state can be set after the predetermined time period. Accordingly, even if the user forgets the setting of the screen lock state, the screen lock state can be automatically set.

A further embodiment further comprises a security lock setting module operable to set a security lock state that use of a specific function is restricted when the display is turned off by the turning off module in a state that the specific function is being performed; a security lock screen displaying module operable to display a security lock screen if the security lock state is set when the operating module receives the operation in a state that the display is turned off by the turning off module; and a security lock canceling module operable to cancel the security lock state when an operation for canceling the security lock state is performed, wherein the displaying processing module displays the previous screen before the display is turned off by the turning off module when the security lock state is canceled.

In the further embodiment, when a specific function that private information of the user is displayed, for example, if the display is turned off by the turning off module, the security lock setting module (30, S87) sets the security lock function that restricts the use of the specific function by a personal identification number or the like. If the operation by the user is received when the security lock state is set, the security lock screen displaying module (30, S103) displays the security lock screen on the display. If the canceling operation that a personal identification number is input, for example, is performed, the security lock canceling module (30, S107) cancels the security lock state. If the security lock state is canceled, the screen of the specific function that was displayed before the display is turned off by the turning off module is displayed on the display.

According to the further embodiment, in a case where the display is temporarily turned off in a state that the specific function is performed, it is possible to bring the mobile terminal into a security protected state.

A still further embodiment is according to any one of the first invention to the third invention, wherein the operating module includes a first key for temporarily turning off the display, and the second condition includes an operation to the first key, and the turning off module turns off the display when the operation is performed to the first key.

In the still further embodiment, the first key (70) is a software key that is displayed on the display, for example, and used for temporarily turning off the display. If the operation is performed to the first key, the display is turned off and the setting module is invalidated.

According to the still further embodiment, it is possible for the user to set the screen lock state by performing a key operation.

A yet further embodiment wherein the operating module further includes a second key that is different from the first key, and further comprises a screen lock screen displaying module operable to display a screen lock screen when an operation is performed to the second key at a time that the screen lock state is set in a state that the function is performed.

In the yet further embodiment, the second key (22*b*) is a key for displaying a predetermined screen. Then, the screen lock state is set when an arbitrary function is performed, and if the operation to the second key is performed, the screen lock screen displaying module (30, S53) displays the screen lock screen.

According to the yet further embodiment, it is possible for the user to know whether an arbitrary function is performed even if the screen lock state is set.

The other embodiment is a lock state control method of a mobile terminal (10) which comprises a display (14); a touch panel (16) provided on the display; a detecting module (48) operable to detect a touch operation to the touch panel; an operating module (40: 22, 70) operable to receive an operation by a user; a setting module (30, S25) operable to set a screen lock state that a part of the operation is invalidated when a first condition is satisfied, comprising steps of: turning off (S29) the display when a second condition is satisfied in accordance with the operation by the user; invalidating (S31) the setting module when the display is turned off; and displaying (S59) on the display a previous screen before the display is turned off by the turning off module when the operating module receives the operation in a state that the setting module is invalidated.

In the other embodiment, the user can easily decide whether the screen lock state is to be set in accordance with the situation that the mobile terminal is used.

Although the present invention has been described and illustrated in detail, it is clearly understood that the same is by way of illustration and example only and is not to be taken by way of limitation, the spirit and scope of the present invention being limited only by the terms of the appended claim.

DESCRIPTION OF NUMERALS 10 denotes mobile phone,
14 denotes a display,
16 denotes a touch panel,
30 denotes a processor,
40 denotes an input device,
44 denotes a flash memory,
46 denotes a RAM, and
48 denotes a touch panel control circuit.

The invention claimed is:

1. A mobile terminal, comprising:
a housing having a front surface;
a display on the front surface of the housing;
an input device comprising a plurality of keys comprising one or more touch keys or icons on a touch panel on the display and one or more hardware keys located on the housing;
a processor configured to:
control display of one or more display screens on the display on detection of a user touching a touch key or icon location on the touch panel or operating one of the hardware keys, one of the touch keys or icons comprising a first key or icon for temporarily turning off the display;
detect a first operation by a user to the first key or icon on the touch panel and a second operation by a user to the one or more hardware keys, respectively;
set a screen lock state in which a part of the first operation is invalidated when a first condition comprising a second operation to a hardware key is satisfied;
turn off the display while the mobile terminal is powered on when a second condition comprising operation of the first key or icon on the touch panel is satisfied;
invalidate the setting of the screen lock state for a predetermined time period while the mobile terminal is powered on when satisfying the second condition results in turning off the display;
display on the display a previous screen in response to detecting the second operation during the predetermined time period after the display has been temporary turned off by operating the first key or icon on the touch panel, while the setting of the screen lock state is invalidated; and
stop invalidating the setting of the screen lock state on expiry of the predetermined time period.

2. A mobile terminal according to claim 1, wherein the processor is further configured to;
set a security lock state in which use of a specific function comprising display of a display screen including a user's private information on a display screen is restricted when satisfying the second condition results in turning off the display while the specific function is being performed;
cancel the security lock state in response to detecting an operation for canceling the security lock state to the input device, wherein the processor displays a first screen in response to detecting at least one of the first operation and the second operation while setting the security lock state; and
display the previous screen when the security lock state is canceled.

3. A mobile terminal according to claim 1, wherein the input device further comprises a second key that is different from the first key, and the processor is further configured to display a screen lock screen in response to detecting an operation to the second key when the screen lock state is set while a function is performed.

4. The mobile terminal according to claim 3, wherein the processor causes the display to display a previous screen in response to detecting performance of a canceling operation by a user on the screen lock screen after display of the screen lock screen.

5. The mobile terminal according to claim 4, wherein the screen lock screen comprises a predetermined object displayed on the screen and detection of the canceling operation comprises detecting a user touching a predetermined position on the displayed object.

6. A method for controlling a lock state of a mobile terminal, the method comprising:
detecting first and second operations by a user to one or more keys comprising touch keys or icons located on a touch panel on a front surface of a housing of a mobile terminal and one or more hardware keys of the mobile terminal, respectively, the one or more keys comprising at least a first key comprising a touch key or icon for temporarily turning off a display of the mobile terminal;
setting a display of the mobile terminal to a screen lock state in which a part of the first operation is invalidated when a first condition comprising a second operation to a hardware key is satisfied;
turning off a display of the mobile terminal while the mobile terminal is powered on when a second condition comprising a first operation to the first key or icon on the touch panel is satisfied;
invalidating the setting of the display to the screen lock state in which part of the first operation is invalidated for a predetermined time period when satisfying the second condition results in turning off the display;
displaying on the display a previous screen in response to detecting the second operation during the predetermined time period after the display has been temporary turned off by operating the first key or icon on the touch panel, while the setting of the screen lock state is invalidated; and after expiry of the predetermined time period, stopping the invalidation of the setting of the screen lock state, and setting the screen to the screen lock state on detection of the second operation to the hardware key after stopping invalidation of the setting of the screen lock state.

7. The method according to claim 6, further comprising displaying on the screen a previous screen on detection of a canceling operation by a user on the screen lock screen.

* * * * *